United States Patent [19]

Roberts

[11] Patent Number: 4,798,922

[45] Date of Patent: Jan. 17, 1989

[54] SPRING ACTUATED LATCH, LOAD AND TRIP MECHANISM FOR SWITCHGEAR

[75] Inventor: Gerald B. Roberts, Paris, Mo.

[73] Assignee: A. B. Chance Company, Centralia, Mo.

[21] Appl. No.: 106,546

[22] Filed: Oct. 6, 1987

[51] Int. Cl.⁴ ........................ H01H 1/42; H01H 3/00; H01H 5/10; F16C 33/10

[52] U.S. Cl. .................................... 200/400; 200/431; 200/472; 200/15; 74/97; 74/100 R; 74/594; 384/292

[58] Field of Search ............. 200/48 R, 48 KB, 48 V, 200/48 SB, 48 CB, 153 G, 153 SC, 153 L, 153 H, 155 R, 164 A, 323, 324, 325, 15, 18, 162, 63 R, 63 A; 74/97, 100 R, 594; 361/335, 340, 351; 384/292

[56] References Cited

U.S. PATENT DOCUMENTS

| | | | |
|---|---|---|---|
| 1,696,150 | 12/1928 | Sachs | 361/366 |
| 3,264,420 | 8/1966 | Charbonneau | 200/48 R |
| 3,563,102 | 2/1971 | Bernatt et al. | 74/100 R |
| 3,783,214 | 11/1974 | Davies | 200/153 SC |
| 3,980,977 | 9/1976 | Evans | 335/76 |
| 4,013,852 | 3/1977 | Roberts et al. | 200/146 R |
| 4,019,008 | 4/1977 | Kohler et al. | 200/153 SC |
| 4,295,024 | 10/1981 | Kamp | 200/288 |
| 4,324,963 | 4/1982 | Maier et al. | 200/318 |
| 4,351,994 | 9/1982 | Evans et al. | 200/153 SC |
| 4,636,602 | 1/1987 | Hall et al. | 200/153 SC |
| 4,713,503 | 12/1987 | Kamp | 200/144 B |

*Primary Examiner*—A. D. Pellinen
*Assistant Examiner*—David A. Osborn
*Attorney, Agent, or Firm*—Hovey, Williams, Timmons & Collins

[57] ABSTRACT

Improved blade-type, air dielectric switchgear apparatus is provided having spring loaded, fast acting, operator independent mechanism for selective opening and closing of internal switch contacts. Preferably, the operating mechanism includes a pair of opposed, pivotal, notched, scissor-like arms with a rotatable latch plate therebetween; a pair of latching pins are carried by the plate, and the latter is operably connected with a power spring assembly. A trip element is also provided which, upon rotation thereof in either a clockwise or counterclockwise direction, serves to shift a corresponding arm away from the latch plate to disengage the latching components. At this point a high velocity rotational movement is imparted to the latch plate by the spring assembly to rotate the latch plate to a second position wherein the plate and the opposed arm come into latching engagement. The trip element is provided with stops to prevent pivoting thereof to an over center condition with respect to the power spring assembly, thereby eliminating the possibility that a lineman operating the switchgear will mistakenly believe that the switchgear contacts have been separated, when in fact they have remained in engagement. The pin and notch latching arrangement is also designed to give a positive weld break function during initial stages of operation of the mechanism. The switchblade shaft is preferably pivotally supported by means of an inexpensive threaded connection which also gives a degree of axially adjustability to the shaft.

16 Claims, 2 Drawing Sheets

SPRING ACTUATED LATCH, LOAD AND TRIP MECHANISM FOR SWITCHGEAR

BACKGROUND OF THE INVENTION

1. Field of the Invention

The present invention is broadly concerned with improved electrical switchgear for use in electrical transmission and distribution systems which makes use of a novel spring-loaded, fast acting, operator independent mechanism for selectively opening and closing the switchgear contacts. More particularly, it is concerned with switchgear operating mechanisms designed for controlled velocity switch contact opening and closing with positive weld break and external indication of the position of the switch contacts (i.e., either opened or closed) so as to eliminate the possibility of a lineman believing that the contacts are opened when in fact they remain in a closed position. In addition, the invention provides a unique, low cost, threaded bearing support for the shiftable switch contacts.

2. Description of the Prior Art

Electrical utilities make use of a large number and variety of switchgear devices in their transmission and distribution systems. Such devices are used for sectionalizing purposes in order to isolate respective zones for component repair or the like and to provide desirable system coordination. System switchgear of this type may be of the padmounted variety and can include vacuum switches under oil or air dielectric switchgear, the latter typically having pivotal switchblades therein carrying movable switch contacts. In any event, switchgear apparatus used in transmission and distribution systems must have an operating mechanism associated therewith for rapid, safe, sure opening and closing of the switch contacts in order to correspondingly break and make electrical circuits through the gear.

Many switch gear operating mechanisms are of the spring-loaded toggle variety, i.e., they make use of a pair of pivotally interconnected toggle links which are spring-loaded and designed, upon movement of an external handle, to go over center and thereby rapidly shift an interconnected spring contact either toward or away from a mating contact. Such toggle mechanisms can present difficulties in that it is possible for such mechanisms to give a false indication of switch contact opening. Specifically, when a lineman manipulates an external operating handle coupled with a toggle-type mechanism, the mechanism can be moved to an over center position while the contacts remain in engagement. When this occurs, the lineman, perceiving that the operating handle has shifted to a position indicative of contact separation, may falsely believe that the contacts have been separated. As can be appreciated, this is a dangerous situation and should be avoided. However, because of the over center operation inherent in toggle mechanisms, this type of false indication of operation is difficult to avoid. As a consequence, many air dielectric switchgear devices have a window permitting the lineman to visually verify the condition of the switch contacts. Nevertheless, the problem of false indication of operation can be a serious one.

Other, non-toggle types of switch operating mechanisms have also been proposed in the past. Certain of these suffer from the problem that they are not operator independent. That is to say, it is important that switchgear operator mechanisms be designed such that, once a lineman initiates operations thereof, the speed of contact opening and closing be both rapid and independent of further actions on the part of the lineman. This prevents undesirable slow opening or closing of the contacts (which can result in pitting or burning of the contacts due to arcing) or "teasing" of the operating mechanism by the lineman.

SUMMARY OF THE INVENTION

The problems outlined above are solved by the present invention which provides improved electrical switchgear for use in electrical transmission and distribution systems. Broadly speaking, the switchgear of the invention includes a pair of mated, electrically conductive switch contacts adapted for selective engagement and disengagement to complete (make) and break an electrical circuit through the switchgear. The contact arrangement can be of any suitable type, e.g., vacuum bottle contacts or, more preferably, the well known switchblade mechanisms making use of a stationary contact and an elongated, pivotal contact, the latter being supported on a pivotal switchblade.

The operating mechanism of the invention is operably coupled with a movable switch contact for selectively moving the same into and out of engagement with the mating contact. In the case of the described switchblade-type devices, the operating mechanism is typically coupled, via an output shaft, to the switchblades of the gear.

Generally speaking, the preferred operating mechanism of the invention comprises first and second opposed arms pivotally supported for movement thereof toward and away from each other. Advantageously, the arms are coaxially mounted to define a scissor-like arrangement. A rotatable latch plate also forms part of the operating mechanism, together with selectively engagable latching means including latching components for alternate latching engagement between the latch plate and the arms. The latch plate is preferably disposed between the opposed arms and carries latching pins; and the arms are provided with strategically located and configured notches for alternate receipt of a pin carried by the latch plate.

A shiftable trip element is located proximal to the opposed arms so that, upon movement of the trip element in either of respective first and second directions, the corresponding arm is engaged and pivoted away from the opposed arm. In preferred forms, the trip element is in the form of an elongated, pivotally mounted lever including a pin oriented for alternate engagement with the arms as the lever is rotated in either a clockwise or counterclockwise direction.

The overall mechanism also includes spring means operably coupled with the latch plate. The spring means serves to impart a high velocity rotational movement to the latch plate in response to shifting of the trip element a predetermined distance until the corresponding arm is pivoted away from the latch plate a sufficient distance to disengage the latching components. The latch plate is thus moved under the influence of the spring means to a shifted position where a reengagement between the latch plate and the other, opposed arm is effected. The movable shiftgear contact is operably coupled with the latch plate and is designed so that the switch contact moves into or out of engagement with the mating contact in response to spring-induced rotation of the latch plate between its latched positions.

In particularly preferred embodiments of the invention, the spring means is in the form of an elongated coil spring coupled between a pivotal trip element and the rotatable latch plate, with the trip element being supported for alternate pivotal movement in either a clockwise or counterclockwise direction from respective starting positions. Moreover, means is provided for preventing pivoting of the trip element beyond the over center position thereof with respect to the coiled spring, as the trip element is pivoted in either direction. Thus, in the event of a failure of the switchgear contacts to separate when the trip element is pivoted in a direction for expected switchgear contact separation, the trip element will be returned to its starting position under the influence of the coiled spring. As can be appreciated, this operation results from the fact that the trip element cannot go over center with respect to the coiled spring, in contradistinction to conventional toggle operating mechanisms.

The preferred latching arrangement between the latch plate and arms is in the form of a pair of pins carried by the latch plate and corresponding pin-receiving notches in the arms. In order to provide a desirable weld break function, each of the arm notches are configured to present a camming surface which, during initial blade movement toward the end of the opening sequence, engages the latch pin and exerts a direct mechanical force through the operating mechanism to the switch contacts. This in turn facilitates breaking of any contact welds.

Finally, the preferred switchgear of the invention makes use of novel bearing structure for the rotatable switchblade shaft. In particular, the end of the shaft is threaded and is received by a correspondingly threaded stationary boss. The shaft end and boss are designed to permit rotation of the shaft relative to the boss during switch operation, and typically the threads are lubricated and corrosion-resistant. Hence, this threaded connection affords adequate bearing support for the switchblade shaft, which is of course operated only intermittently and occasionally during the useful life of the switchgear.

DESCRIPTION OF THE PREFERRED EMBODIMENT

Figure 1:
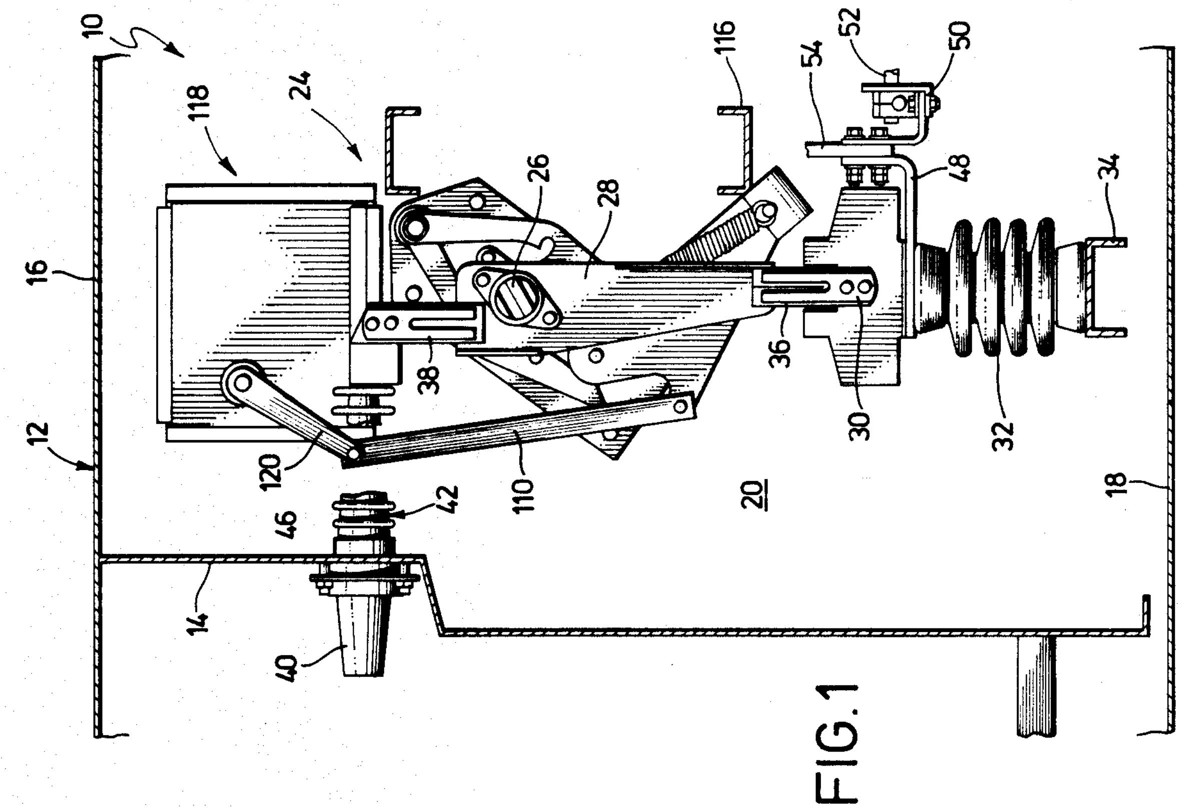
FIG. 1 is a fragmentary, vertical sectional view illustrating the internal configuration of a 3-phase, switchblade-type switchgear incorporating the preferred operating mechanism of the invention.
Figure 2:
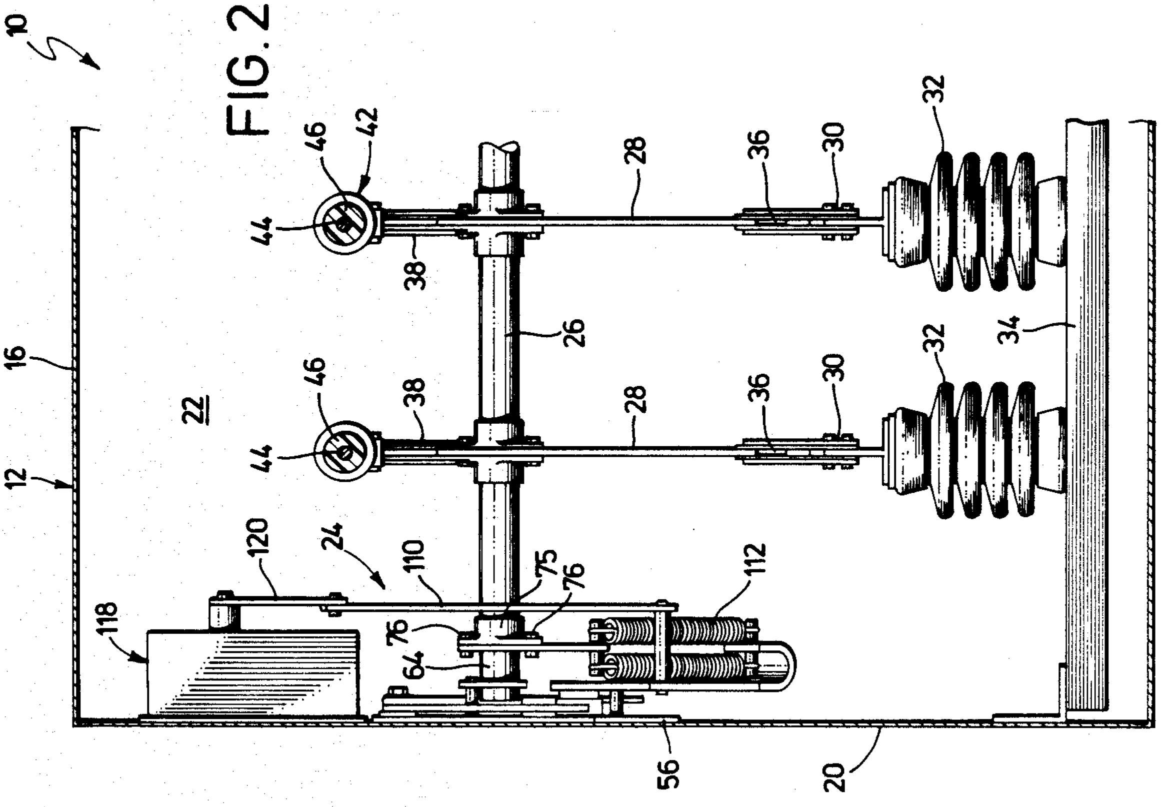
FIG. 2 is a fragmentary view in partial vertical section further illustrating the internal configuration of the gear depicted in FIG. 1.

Turning now to the drawings, switchgear apparatus 10 in accordance with the invention is illustrated in FIGS. 1 and 2. The depicted apparatus 10 is in the form of switchblade-type, air dielectric gear and includes an outer surrounding housing 12 having an upstanding source side bushing wall 14, top wall 16, bottom wall 18, spaced sidewalls 20, and an upstanding load side bushing wall 22 in opposed relationship to wall 14.

A pair of switch operating mechanisms 24 are respectively mounted adjacent each of the sidewalls 20, although a single mechanism could be employed. Inasmuch as each of these mechanisms 24 are identical, only one is depicted and described herein. In any event, an elongated, switchblade-supporting shaft 26 extends outwardly from each of the mechanisms 24 and is supported in a manner to be described hereinafter. Each shaft 26 carries three spaced apart switchblades 28 which are secured to the shaft 26 so that they pivot in unison. In more detail, each of the phase switches within apparatus 10 is identical and includes a stationary, metallic, bifurcated contact 30 supported on a skirted insulator 32. All of the insulators 32 are secured to a support channel 34 extending between and connected to the sidewalls 20. Each phase switch further has a movable contact 36 designed to be received and engaged with the associated stationary contact 30. The movable contact 36 forms a part of an elongated depending switchblade 28, the latter as described being rigidly secured to shaft 26. The end of each switchblade 28 remote from contact 36 is received by a stationary frictional fit metallic terminal 38 (see FIGS. 1 and 2). Each terminal 38 forms a part of a source bushing assembly 40 affixed to wall 14. An electrical connection between the outer end of assembly 40 and its associated inboard terminal 38 is effected by means of an elongated skirted connector 42 as shown in FIG. 2, including a central metallic conductor 44 together with an outer, surrounding insulative jacket 46. Further details pertaining to the bushing assemblies, and the overall switchgear, are to be found in simultaneously filed application Ser. No. 106,379 entitled "Replaceable Bushing and Contact Assembly for Blade Type Air Insulated Switchgear" in the names of Gerald Roberts, et al., and this application is incorporated by reference herein.

Each stationary contact 30 is provided with an L-shaped metallic bracket 48 designed to permit connection of a terminal 50 and conductor 52, the latter leading to a fuse assembly and a corresponding load side bushing (not shown) affixed to bushing wall 22. In addition, appropriate U-shaped buss bars 54 are connected to the bracket 48 and extend between and electrically interconnect associated phase switch mechanisms within apparatus 10. Finally, although not depicted for reasons of clarity, it will be understood that each switch mechanism is typically provided with an arc-suppressing chute adjacent the contacts 30, 36.

Figure 3:
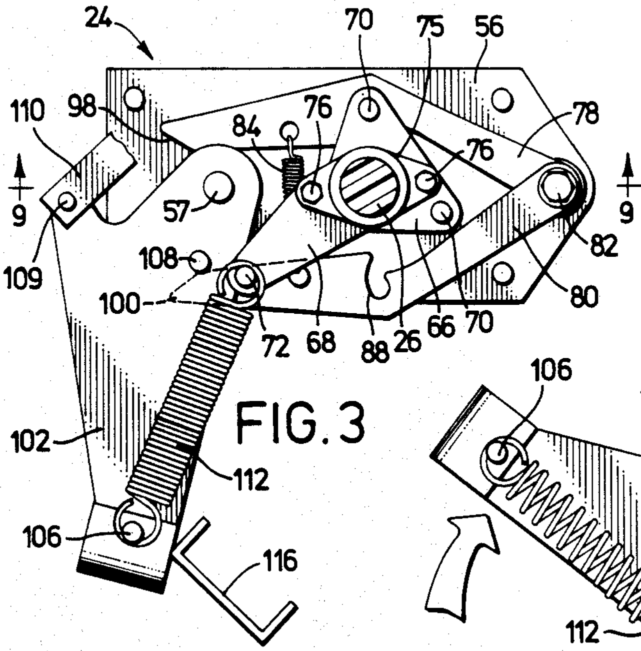
FIG. 3 is a side elevational view with parts broken away for clarity of the preferred switch operating mechanism of the invention, shown in the position thereof corresponding to the closure of the switchgear contacts.
Figure 4:
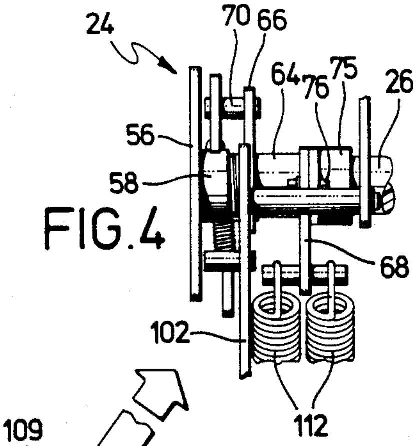
FIG. 4 is a fragmentary end view of the mechanism illustrated in FIG. 3.
Figure 5:
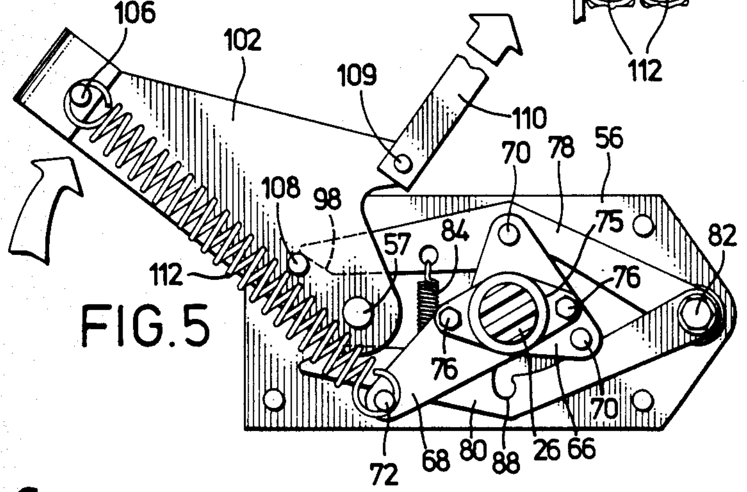
FIG. 5 is a view similar to that of FIG. 3 but illustrating the configuration of the mechanism during operation thereof to open the switchgear contacts.

The operating mechanism 24 is best illustrated in FIGS. 3–9. In particular, the mechanism 24 includes a base plate 56 which is rigidly attached to housing wall 20 and has a pair of spaced, outwardly extending, internally threaded bosses 58, 60 together with a threaded opening 62 therein. A short, threaded hollow stub shaft 64 is received within boss 58 and extends outwardly from base plate 56. Stub shaft 64 carries a somewhat triangularly-shaped latch plate 66 together with an outermost, elongated, somewhat triangular lever plate 68. Latch plate 66 supports a pair of spaced apart latching pins 70 which extend from the plate 66 toward base plate 56 (see FIG. 9). Plate 68 on the otherhand is provided with an elongated spring connector 72 having a pair of spring end-receiving grooves 74 therein. As best seen in FIG. 4, shaft 26 is secured coaxially to stub shaft 64 for simultaneously pivoting movement thereof. To this end, shaft 26 is provided with a connector 75 which, in conjunction with bolts 76, gives the needed shaft interconnection.

The operating mechanism 24 also has a pair of opposed latch arms 78, 80 which are mounted for relative pivotal movement. Specifically, the arms 78, 80 are coaxially mounted to base plate 56 by means of a pivot bolt 82 and sleeve 83 (see FIG. 9), with the former being received within opening 62. The arms 78, 80 are biased together by means of a spring 84 as illustrated, and moreover each arm has a strategically located and configured notch 86 or 88 at the apex region thereof. In particular, each of the arm notches includes (see FIG. 7) a smoothly rising entrance cam surface 90, an arcuate pin-receiving region 92, and an exit cam surface 94, the latter leading to a shoulder 96. Each of the arms is also provided with an oblique operating surface 98, 100 at the end of the associated arm remote from pivot bolt 82.

An elongated trip lever or element 102 is rotatably supported on base plate 56 via shaft 57. It will be seen that the trip element is somewhat mitten-shaped and is provided with a threaded tubular connector extension 104 received within boss 60 (see FIG. 9). The element 102 further carries a transversely extending spring connector 106 adjacent the end thereof remote from extension 104, along with an actuating pin 108. Finally, the element 102 has a connector pin 109 in the "thumb" region thereof so as to permit connection of an elongated operating link 110.

A pair of elongated, coiled power springs 112 are coupled between the spring connector 72 of lever plate 68 and the spring connector 106 of operating element 102. These springs 112 are of sufficient mass and strength for the powered operation of the mechanism 24 to be described. A feature of the design is the fact that power springs 112 of various spring tensions may readily and easily be mounted as desired between pins 72 and 106 for selective variation of the opening speed and closing speed of switch contacts controlled by the mechanism 24.

Returning to FIG. 1, it will be seen that an upper stop 114 and a lower stop 116 are strategically oriented adjacent the operating mechanism 24. These stops 114, 116 are shown schematically in in FIGS. 6 and 3 respectively, and the importance of these will be explained hereinbelow.

In order to effect operation of the mechanism 24 from a point externally of housing 12, a conventional linkage and motion transmission assembly 118 is provided which includes pivotal link 120. An external operating handle (not shown) is operably coupled to the assembly 118 so that, upon pivotal movement of the handle, a corresponding movement of link 110 is provided. Alternately, an external operating mechanism could be employed which is directly coupled to the shaft 57, thereby eliminating the need for link 110 and its associated operator.

The operation of mechanism will next be described. It will be assumed that the respective switch contacts 30, 36 associated with the mechanism 24 are in closed position as depicted in FIGS. 1 and 2. This corresponds to the rest position of the mechanism 2 illustrated in FIGS. 1, 3, and 4. In this contact closed, rest position the upper latch pin 70 as viewed in FIG. 3 is received within the notch 86 of arm 78, and operating element 102 is in its downwardly pivoted rest position against lower stop 116.

If it is desired to open the switches associated with mechanism 24, the external handle for that mechanism is pivoted toward the switch open position thereof. Such pivotal motion is transmitted via assembly 118 and links 120, 110 to trip element 102. This is in turn causes rotation of the trip element 102 in a clockwise fashion as seen in FIG. 3 until the element 102 reaches a position where pin 108 comes into contact with operating surface 98 (see FIG. 5). At this point in the operation of mechanism 24, it will be observed that opposed arm 80 has been moved upwardly a slight amount under the influence of spring 84, while power springs 112 have been elongated and tensioned.

Continued rotation of the element 102 through the aforementioned linkage assembly causes arm 78 to be lifted as pin 108 operates against surface 98 until the latching interengagement between upper pin 70 and notch 86 is broken. When this occurs, power springs 112 operate to rapidly rotate latch plate 66 to move the same in a clockwise fashion until lower latch pin 70 comes into position for receipt by notch 88 of arm 80 (see FIG. 6). In this regard, as the latch plate 66 is rotated under the influence of power springs 112, the lower pin 70 comes into contact with arm 80 and rides up and over cam surface 90 to be received within region 92. At the same time, the spring 84 acts to assure a positive engagement between the latching components.

Figure 6:
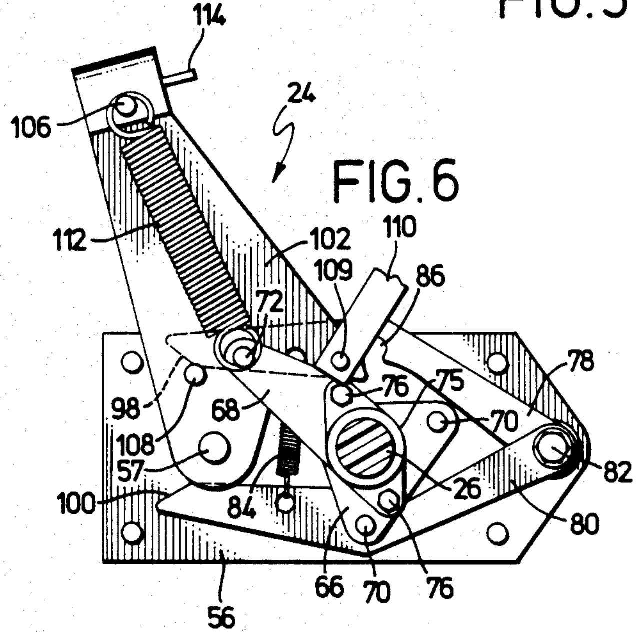
FIG. 6 is an elevational view similar to that of FIGS. 3 and 5 but depicting the operating mechanism in its second latched position corresponding to the switchgear contacts being in an opened condition.
Figure 7:
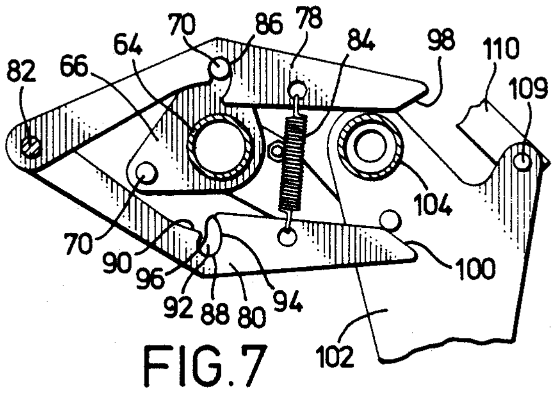
FIG. 7 is an elevational view of the switchgear operating mechanism in the FIG. 3 (contacts closed) position, but illustrating the side of the mechanism opposite of that shown in FIG. 3.
Figure 8:
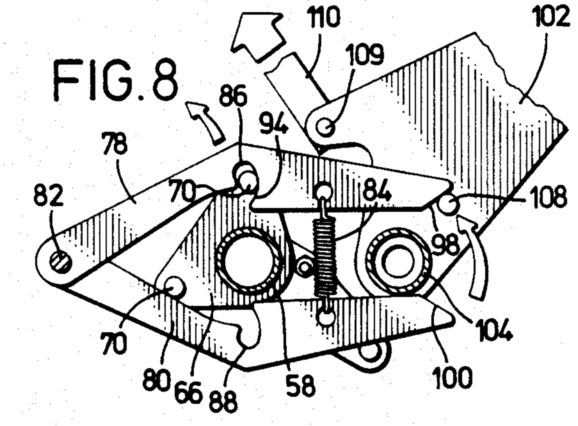
FIG. 8 is elevational view of the switchgear operating mechanism in the FIG. 5 intermediate position, but illustrating the side of the mechanism opposite of that shown in FIG. 5.
Figure 9:
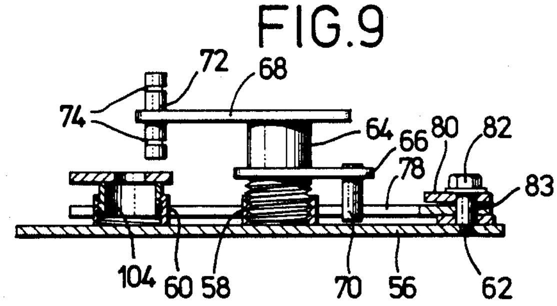
FIG. 9 is a fragmentary sectional view taken along line 9—9 of FIG. 3 illustrating certain components of the operating mechanism and the preferred threaded bearing support for the switchblade shaft.

It will also be seen that, in the second rest position of the mechanism 24 as illustrated in FIG. 6, the outer end of element 102 abuts upper stop 114. It is noteworthy that this occurs before the element 102 is rotated over center with respect to the springs 112.

From the foregoing, it will be readily appreciated that as the latch plate 66 is rotated from its FIG. 3 to its FIG. 6 position, shaft 26 is similarly rotated. This in turn causes rapid movement of the interconnected switchblades 28, with the result that the movable contacts 36 are rapdily disengaged from their mating contacts 30. Of course, the degree of rotational motion imparted to the latch plate 66 is correlated with the respective associated switches so that proper clearance between the movable and stationary contacts is provided when the latch plate reaches its contact open rest position depicted in FIG. 6.

It will furthermore be clear to those skilled in the art that movement of the mechanism from the FIG. 6 contact open to the FIG. 3 contact closed position proceeds in exactly the same manner as described, except that the rotation of the shaft 26, plate 66 and element 102 is counterclockwise.

An important advantage of the operating mechanism of the present invention stems from the fact that there is no possibility of a false indication of swtich opening. This result obtains because the operating mechanism does not gò over center with respect to the springs 112. Stated otherwise, if the switch contacts 30, 36 fail to open, the springs 112 will return the external operating handle to its initial position, i.e., the element 102 is shifted back to its lower rest position depicted in FIG. 3 and the linkage structure connected thereto is correspondingly oriented. This represents a distinct improvement accompanied with over center toggle arrangèments.

Furthermore, use of the threaded bearing support for shaft 26 represents a low-cost alternative to conventional bearings. Inasmuch as a given gear may be operated relatively infrequently, threading provides sufficient strength. The use of a threaded bearing in this context also gives a degree of axial adjustability to shaft 26 for more precise positioning of the switchblades 28 relative to the stationary contacts 30. The opposite end of the shaft 26 remote from the mechanism is normally rotationally supported by means of a synthetic resin bearing secured to a stationary, upright plate.

In the event that a contact weld is present between contacts 30, 36, the weld break structure of the invention comes into play. Specifically, and referring to FIG. 8, it will be seen that during the operation of mechanism 24 the engaged pin 70 forcibly contacts the exit cam surface 94 of the notch, so that a direct, high mechanical advantage force is applied through the mechanism 24 to the welded contact. This assures that the contacts will separate in the desired fashion.

It will further be observed that the specific configuration of the generally C-shaped notches 86, 88 prevents the associated pins 70 when received in a respective notch from being displaced or shifting out of a corresponding notch during switch operation. These notches are strategically positioned and of disposition such that they positively stop the rotation of a switchblade controlled by the mechanism 24 in the proper position of such blade while minimizing the amplitude of any oscillating blade movement. As a result, additional means is not required to absorb the energy of blade movement. Furthermore, the specially shaped notches and their disposition with respect to the pins received therein hold the blade or switchblades in the closed position during high momentary currents preventing electromagnetic forces from forcing the blade contacts open.

I claim:

1. In electrical switchgear having a pair of mated, electrically conductive switch contacts adapted for selective engagement to complete an electrical circuit through the switchgear, operating mechanism operably coupled with at least one of said contacts for selectively moving the one contact into and out of engagement with the mating contact, said mechanism comprising:

first and second opposed arms;

means pivotally supporting said arms for movement thereof toward and away from each other;

a rotatable latch plate disposed between said arms;

selectively engageable latching means including latching components carried by said latch plate and arms respectively for alternate latching engagement between the latch plate and said first and second arms, said latching components comprising pin means carried by said latch plate, and structure defining a pin receiving notch in each of said arms;

a trip element including structure for engaging said arms;

means supporting said trip element proximal to said arms for shifting movement of the trip element in respective first and second directions for alternately engaging and pivoting a corresponding first or second arm away from the opposed arm;

spring means operably coupled with said latch plate for, upon shifting of the trip element a predetermined distance in one of said directions until the corresponding arm is pivoted away from said latch plate a sufficient distance to disengage said latching components, imparting a high velocity rotational movement to said latch plate to reposition the latch plate such that said latching components re-engage to effect an engagement between said latching plate and the other, opposed arm; and means operably coupling said latch plate with said one switchgear contact for movement of the one contact into and out of engagement with the mating contacts in response to said spring-induced rotation of said latch plate.

2. The switchgear as set forth in claim 1, said notch-defining structure presenting, for each of said notches, a camming region for engagement by said pin to impart a direct, mechanical force through said operating mechanism to said one switchgear contact for forced separation of the contacts in the event of a weld therebetween.

3. The swtichgear as set forth in claim 1, said opposed arms being coaxially mounted to cooperatively define a scissor-type linkage, said pivotal supporting means being located at the point of interconnection of said arms.

4. The switchgear as set forth in claim 1, said spring means comprising an elongated coiled spring operably coupled between said trip element and latch plate, said trip element being supported for alternate pivotal movement in either a clockwise or counterclockwise direction from respective starting positions, there being means for preventing pivoting of said trip element beyond an over center position thereof with respect to said coiled spring, whereby, in the event of a failure of said contacts to separate when the trip element is pivoted in a direction for expected switchgear contact separation, said trip element will be returned to the starting position thereof under the influence of said spring.

5. The switchgear as set forth in claim 1, each of said opposed arms including an operating surface, said trip element including pin means for alternately engaging the operating surface of the first or second arm upon shifting of the trip element in a direction for a movement of the corresponding arm.

6. The switchgear as set forth in claim 1, said coupling means including an elongated shaft connected to said latch plate and rotatable therewith, said one contact being connected with said shaft.

7. The switchgear as set forth in claim 1, there being linkage means operably coupled with said trip element for shifting movement of the same, said linkage means being adapted for connection to an operating handle located externally of said switchgear.

8. The switchgear as set forth in claim 1, including a follower spring interconnected between said arms for biasing the same together.

9. The switchgear as set forth in claim 1, one of said switchgear contacts being stationary, the other of said contacts being shiftable with respect to said one contact and being mounted upon a pivotal switchblade.

10. The switchgear as set forth in claim 1, said spring means being operably coupled between said trip element and latch plate.

11. The switchgear as set forth in claim 1, said spring means being essentially relaxed when said mechanism is at rest.

12. In electrical switchgear having a pair of mated, electrically conductive switch contacts adapted for selective engagement to complete an electrical circuit through the switchgear, operating mechanism operably coupled with at least one of said contacts for selectively moving the one contact into and out of engagement with the mating contact, said operating mechanism comprising:

a shiftable latch plate;

cooperable latching structure proximal to said latch plate;

selectively engagable latch means including latching components for selective and alternate latching engagement between said latch plate and said latching structure at different latching positions on the latching structure as the latching plate is shifted;

a pivotally mounted trip element movable in either a clockwise or counterclockwise direction from a starting position;

elongated coil spring means operably coupled with said latch plate for spring-induced shifting of the latch plate to said different latching positions; and means for preventing pivoting of said trip element beyond an over center position thereof with respect to said coiled spring, whereby, in the event of a failure of said switchgear contacts to separate when the trip element is pivoted in a direction for expected contact separation, said trip element will be returned to the starting position thereof under the influence of said spring.

13. The switchgear as set forth in claim 12, said latching structure comprising first and second opposed arms with said latch plate being disposed between said arms, said latching components being respectively carried on said latch plate and arms.

14. The switchgear as set forth in claim 12, said coil springs means being operably coupled between said trip element and latch plate.

15. The switchgear as set forth in claim 12, said spring means being essentially relaxed when said mechanism is at rest.

16. In electrical switchgear having a pair of mated, electrically conductive switch contacts adapted for selective engagement to complete an electrical circuit through the switchgear, one of said contacts being stationary, the other of said contacts being shiftable with respect to the one contact and being mounted upon a switchblade, said switchblade being supported on an elongated shaft for pivotal movement thereof in order to selectively engage and disengage said contacts, the improvement of low cost bearing structure for said switchblade shaft, said improved bearing structure comprising:

screw threading on one end of said shaft; and a mounting element for threadably receiving the threaded end of said shaft, said mounting element being cooperatively threaded, said shaft end and mounting element being cooperatively configured for permitting relative rotation therebetween and limited axial movement during pivotal movement of said switchblade, whereby said switchblade is pivotally supported by virtue of the threaded interconnection between said shaft end and mounting element.

* * * * *